United States Patent [19]

Aoyama et al.

[11] Patent Number: 5,364,270
[45] Date of Patent: Nov. 15, 1994

[54] APPARATUS HAVING VIDEO DISPLAY AND DISPLAY-SYNCHRONIZING MOTION MECHANISM

[75] Inventors: Akihiro Aoyama; Hitoshi Kaneko; Akira Tajiri; Iwao Okamura; Yuzo Tanaka, all of Tokyo, Japan

[73] Assignee: Pioneer Electronic Corporation, Tokyo, Japan

[21] Appl. No.: 895,093

[22] Filed: Jun. 8, 1992

[30] Foreign Application Priority Data

Jun. 25, 1991 [JP] Japan ................................. 3-153382

[51] Int. Cl.$^5$ ........................ G09B 9/08; G09B 19/16
[52] U.S. Cl. ...................................... 434/55; 434/58; 434/307 R; 434/318; 364/578; 273/434; 273/85 G; 369/33
[58] Field of Search ....................... 434/29, 45, 55, 58, 434/61, 62, 307, 308, 309, 318, 365, 372, 373, 59; 364/578, 410; 395/152; 273/85 G, 434–437, 440–442, 460, DIG. 28; 472/30, 47; 369/30, 33; 482/1, 4–7, 901, 902

[56] References Cited

U.S. PATENT DOCUMENTS

| 3,895,354 | 7/1975 | Kish | 482/901 X |
|---|---|---|---|
| 4,066,256 | 1/1978 | Trumbull | 434/59 X |
| 4,305,131 | 12/1981 | Best | 273/434 X |
| 4,381,522 | 4/1983 | Lambert | 358/86 |
| 4,408,613 | 10/1983 | Relyea | 482/900 X |
| 4,490,810 | 12/1984 | Horn | 364/410 X |
| 4,831,242 | 5/1989 | Englehardt et al. | 482/902 X |
| 4,848,744 | 7/1989 | Steininger et al. | 273/434 |
| 4,885,878 | 12/1989 | Wuu | 358/104 X |
| 4,920,432 | 4/1990 | Eggers et al. | 360/33.1 |
| 4,976,438 | 12/1990 | Tashiro et al. | |
| 5,060,932 | 10/1991 | Yamaguchi | 434/45 X |
| 5,199,875 | 4/1993 | Trumbull | 434/58 X |

FOREIGN PATENT DOCUMENTS

| 0479422 | 4/1992 | European Pat. Off. | |
| 3218086 | 12/1983 | Germany | 482/902 |
| 3404539 | 8/1985 | Germany | 482/902 |
| 58-41592 | 3/1983 | Japan . | |
| 60-192873 | 12/1985 | Japan . | |
| 61-68074 | 4/1986 | Japan . | |

OTHER PUBLICATIONS

"Video 'juke box' brings a library into your lounge" by Gordon Hathaway, British Telecom Journal, vol. 8, No. 2, Sep. 1987.

Primary Examiner—Richard J. Apley
Assistant Examiner—Joe H. Cheng
Attorney, Agent, or Firm—Kane, Dalsimer, Sullivan, Kurucz, Levy, Eisele and Richard

[57] ABSTRACT

In an apparatus having a video display and display-synchronizing motion mechanism, various images can be easily selected and displayed, and a seat or the like is moved in synchronism with motions in the images, so that a person can enjoy the images as if real. An information select unit specifies a desired one of a plurality of video/motion information pieces recorded on a storage medium, and an information read unit reads the specified video/movement information. Images formed by video information contained in the readout video/motion information are displayed on a display device, and the seat or the like is moved in synchronism with the images on the basis of motion information contained therein. A monitor unit monitors the readout video/motion information, and stops a read operation of the information read unit when the apparatus malfunctions.

12 Claims, 12 Drawing Sheets

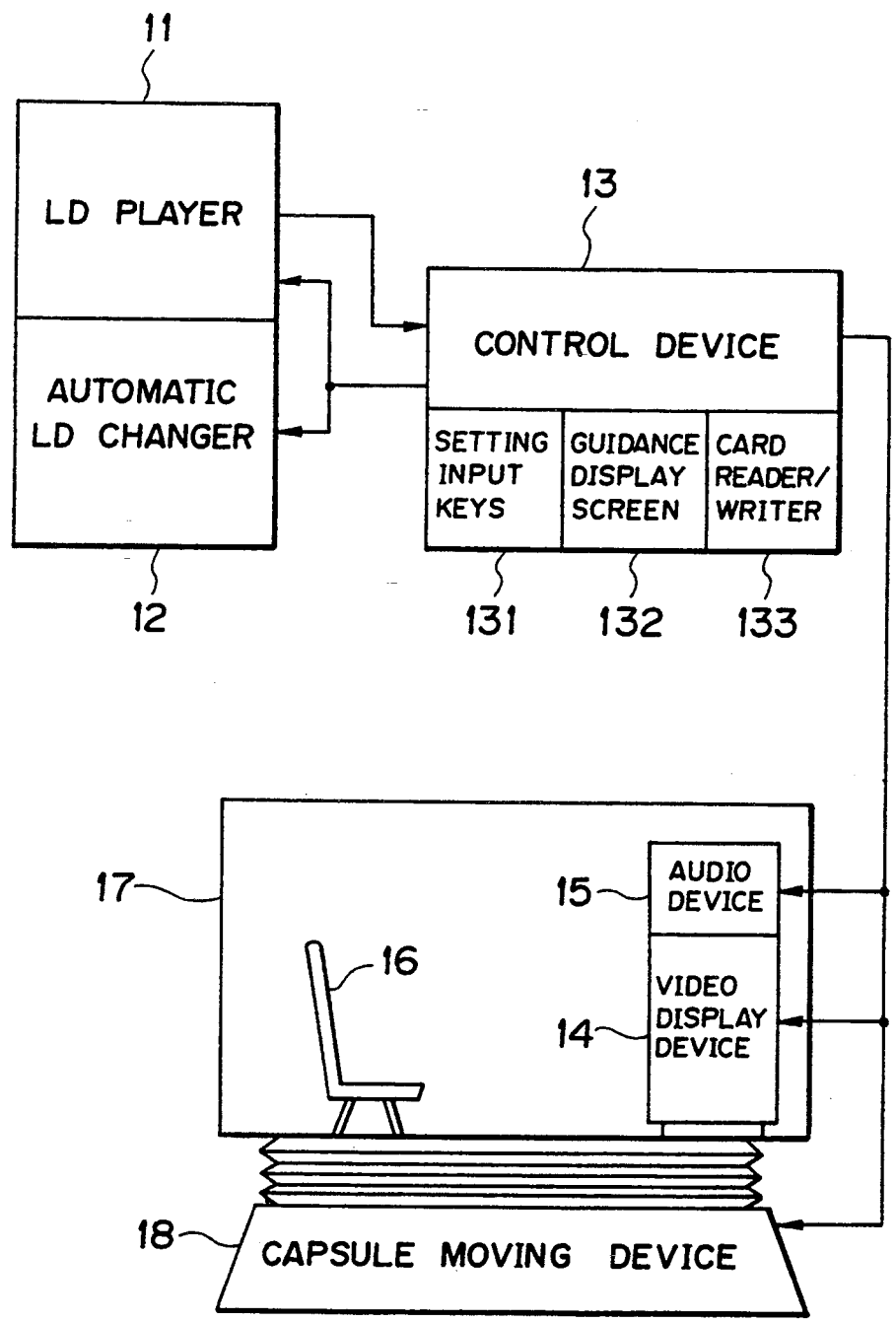
F I G. 2

MANAGEMENT INFORMATION

| DISK NO. | TITLE | CHAPTER NO. |
|---|---|---|
| i | VIDEO PROGRAM A | 1, 2, 3, 4 |
| i | VIDEO PROGRAM B | 5, 6, 7 |
| ⋮ | ⋮ | ⋮ |

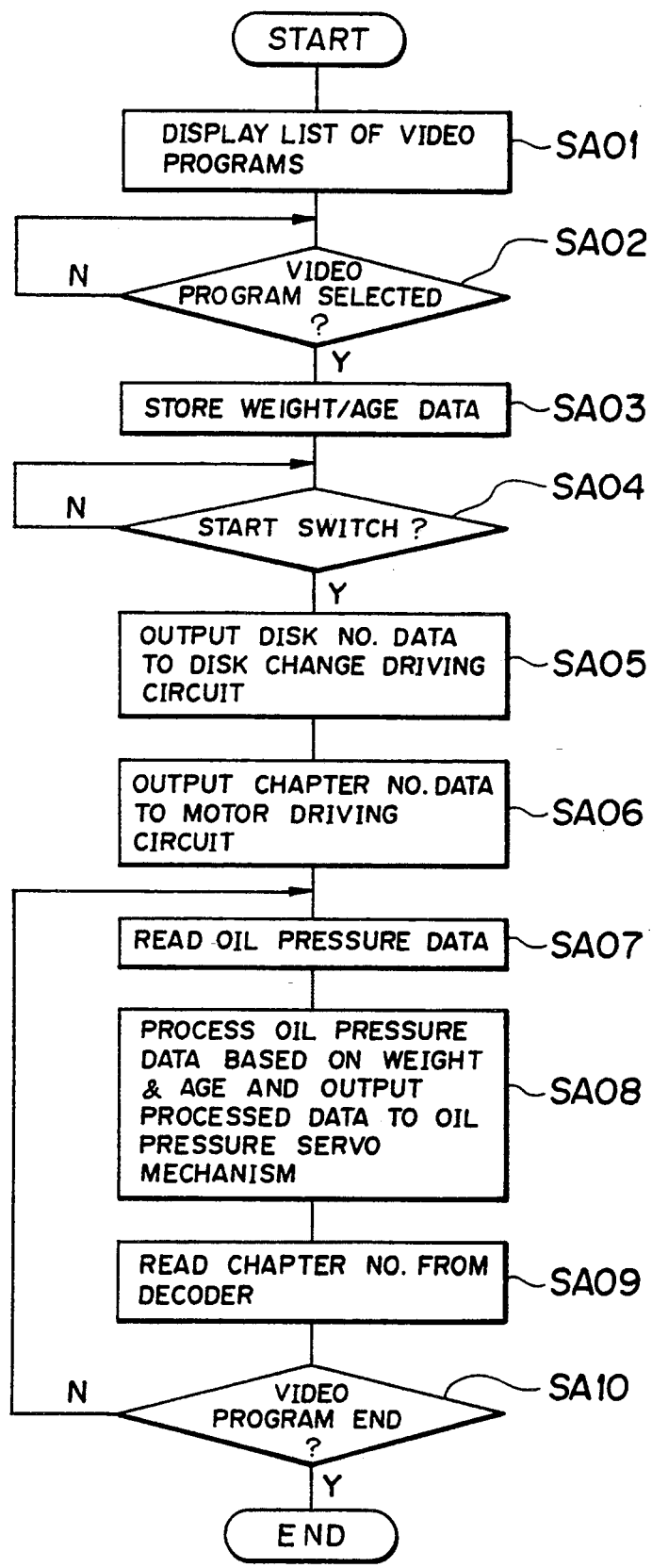

APPARATUS HAVING VIDEO DISPLAY AND DISPLAY-SYNCHRONIZING MOTION MECHANISM

BACKGROUND OF THE INVENTION

The present invention relates to an apparatus which has a video display and a motion mechanism in which a seat or the like is moved in synchronism with a motion in an image projected on the video display.

Recently, there has been provided an apparatus which displays, on a projector, a video program having pictures taken on a jet-coaster and which gives a seat a motion (physical displacement) synchronized with an ascent and descent of the jet-coaster. Such an apparatus simulates a situation such that a passenger of the apparatus feels as if the passenger is really riding on a vehicle.

An apparatus as described above is disclosed in, for example, Japanese Laid-Open Patent Publication 61-68074. The apparatus disclosed in this application has a dome-shaped projection booth equipped with a seat and a projector, and a motion mechanism provided for the projection booth. The motion mechanism is composed of a driving shaft supporting the projection booth, an oil pressure part which has an oil pressure servo mechanism driving the driving shaft, a controller that controls the oil pressure part and the projection booth, and a storage part which stores motion data beforehand for driving the driving shaft via the oil pressure part. With this structure, the controller reads motion data relating to video information from the storage part in response to predetermined synchronous information, and drives the driving shaft via the oil pressure part on the basis of the read motion data. In this manner, the projection booth is moved in synchronism with projected images, and a passenger can feel as if real.

However, a conventional apparatus as described above has a disadvantage in that it is necessary for a skilled operator on the supplier side to set a video program in the apparatus and only video programs set by the operator can be presented to the passengers. Thus, the passengers cannot freely choose favorite video programs and are therefore reluctant to repeatedly enjoy the apparatus. That is, the conventional apparatus does not present various amusements.

Apparatus for driving a projection booth or the like has been disclosed in Japanese Laid-Open Patent Publication No. 58-41592 or Japanese Laid-Open Utility Model Publication No. 60-192873.

SUMMARY OF THE INVENTION

It is an object of the present invention to provide an apparatus having a video display and display-synchronizing motion mechanism in which various video programs can be easily prepared and selected and a favorite video program can be enjoyed as if real.

According to an aspect of the present invention, an apparatus comprising: a storage medium storing a plurality of video/motion information pieces, each including at least video information, motion information associated with the video information and identification information for identifying the video information; an information select unit for specifying the identification information about a video/motion information piece which is one of the video/motion information pieces and which is to be read; an information read unit for reading, from the storage medium, the video/motion information piece related to the identification information specified by the information select unit; a display unit for displaying the video information included in the video/motion piece read by the information read unit; a motion unit for performing a predetermined motion based on the motion information included in the video/motion piece read by the information read unit; and a monitor unit for monitoring the identification information included in the video/motion piece read by the information read unit and for stopping a read operation of the information read unit when the identification information included in the video/motion piece is different from the identification information specified by the information select unit.

In this case, it is preferable that the apparatus comprises a housing unit for housing a plurality of storage media, each being the same as the storage medium, and that the information read unit selects one of the storage media in which the video/motion information related to the identification information specified by the information select unit is stored and reads the video/motion information related to the identification information from the one of the storage media.

It is preferable that the video/motion information stored in the storage medium includes a plurality of divided video/motion information sections, each including a divided identification information piece for identifying one of the divided video/motion information sections; the information select unit sequentially specifies divided identification information pieces respectively included in the divided information sections of the video/motion information which is to be read; the information read unit sequentially reads the divided video/motion information sections related to the divided identification information pieces sequentially specified by the information select unit; and the monitor unit monitors the divided identification information pieces relating to the divided video/motion information sections read by the information read unit and stops a read operation of the information read unit when the divided identification information pieces monitored are different from the respective, divided identification information pieces specified by the information select unit.

It may be possible for the information select unit to sequentially specify a predetermined number of divided identification information pieces relating to the divided video/motion information sections which are to be read.

It is preferable that the information select unit sets a different specifying order of the divided identification information pieces relating to the video/motion information which is to be read each time the video/motion information is read.

According to an aspect of the present invention comprising the above structure, video information and motion information synchronizing a motion in images formed by the video information are stored in a storage medium having a large storage capacity, such as an optical disk in such a manner that the video information and motion information synchronized with the video information can be simultaneously read out therefrom. A plurality of pieces of such video information and a plurality of such motion information are stored in the storage medium, and a desired video/motion information piece can be easily read out therefrom, so that a variety of video images and motions synchronized therewith can be realized.

That is, the information select unit selects, from among the video/motion information pieces, a desired video/motion information piece which is to be read, and informs the information read unit of the identification information about the desired video/motion information piece. The information read unit reads information contained in the video/motion information related to the specified identification information. The video information contained in the readout information is sent to the display unit, and simultaneously the motion information contained therein is sent to the motion unit. Images formed by the video information are displayed on the display unit, and a predetermined motion based on the motion information is made in the motion unit. The monitor unit obtains the identification information specified by the information select unit, and monitors the identification information included in the video/motion piece read by the information read unit. Then the monitor unit stops a read operation of the information read unit when the identification information included in the video/motion piece is different from the identification information specified by the information select unit.

By providing a housing unit for housing a plurality of storage media and selectively reading the video/motion information pieces from the storage media by means of the information select unit, variability can be increased.

Variability can be further increased by dividing each video/motion information into a plurality of sections and providing divided section identification information pieces so that the information select unit and the information read unit can operate for each divided video program section.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the accompanying drawings:

FIG. 2 is a diagram of an embodiment of the present invention;

FIG. 11 is a flowchart illustrating a control procedure in the fifth embodiment of the present invention.

DETAILED DESCRIPTION OF THE PREFERRED EMBODIMENTS

Figure 1:
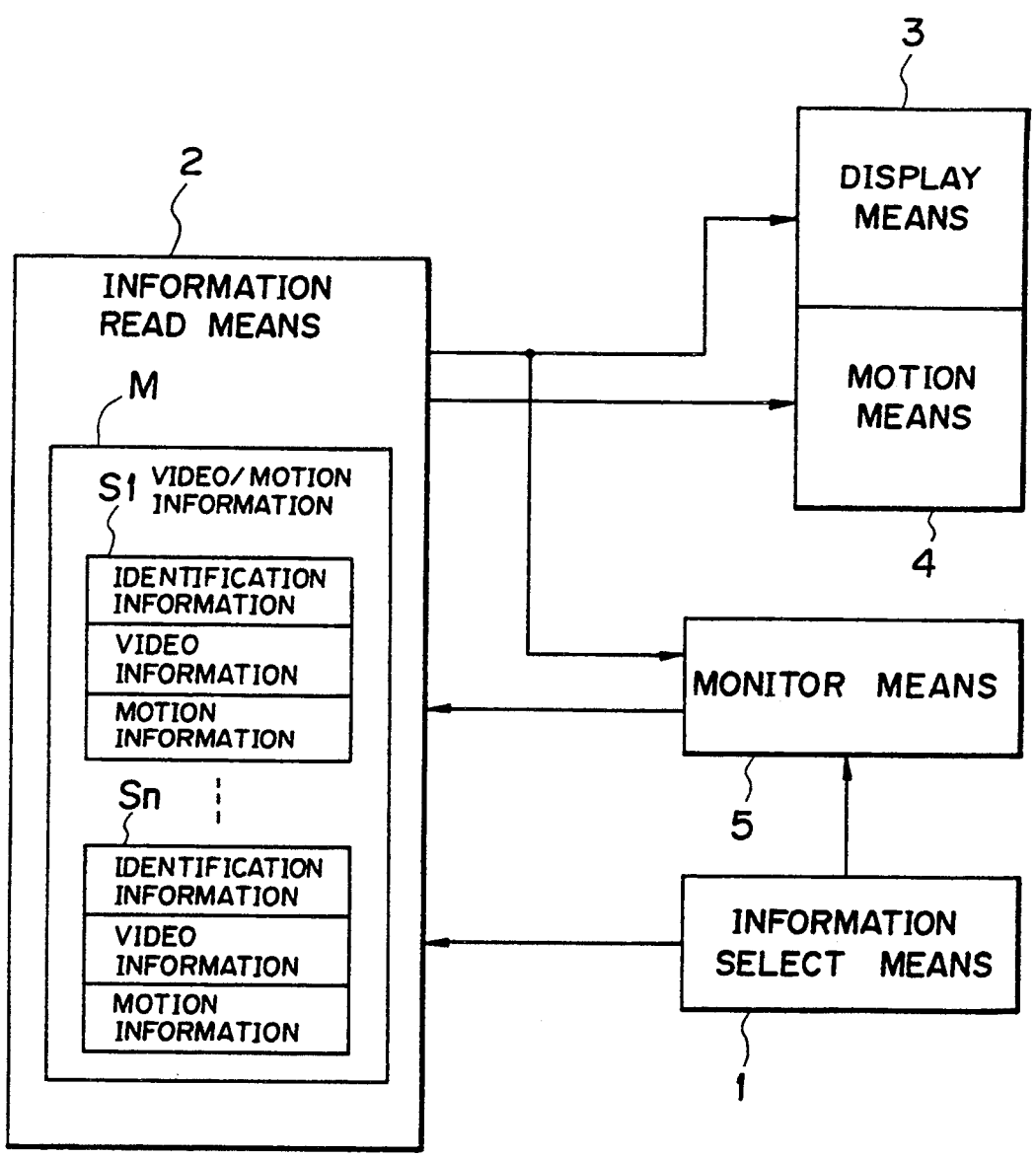
FIG. 1 is a diagram showing the principal structure of the present invention.

A description will now be given of the principle of the present invention with reference to FIG. 1.

An apparatus having a video display and display-synchronizing motion mechanism according to the present invention is composed of a storage medium M, information select means 1, information read means 2, display means 3, motion means 4, and monitor means 5. The storage medium M stores a plurality of video/motion information pieces S1-Sn. Each of the video/motion information pieces includes at least, video information, motion information relating to the video information and identification information for identifying one video information piece. The information select means 1 specifies the identification information of a video/motion information piece which is to be read from the video/information pieces S1-Sn. The information read means 2 reads out the video/motion information piece specified by the information select means 1 from the storage medium M. The display means 3 displays the video information contained in the video/motion information piece read out by the information read means 2. The motion means 4 carries out a predetermined motion based on the motion information included in the video/motion information piece read out by the information read means 2. The monitor means 5 monitors the identification information included in the video/motion information piece read out by the information read means 2, and stops the read operation of the information read means 2 when the identification information does not coincide with the identification information specified by the information select means 1.

In the structure described above, the information select means 1 selects the video/motion information piece to be read out from the video/motion information pieces S1-Sn, and informs the information read means 2 of the selected video/motion information piece. The information read means 2 reads information pieces contained in the video/motion information piece related to the specified identification information. Out of the readout information pieces, the video information is output to the display means 3, and simultaneously the motion information is output to the motion means 4. Video images formed by the video information are displayed on the display means 3. The predetermined motion based on the readout motion information is made by the motion means 4 so that the predetermined motion is synchronized with the video images displayed on the display means 3. The monitor means 5 receives the identification information specified by the information select means 1 as well as the identification information read out by the information read means 2, and determines whether or not the video/motion information to be read has been correctly read out by comparing the above identification information pieces. When it is determined that video/motion information different from the specified video/motion information is read, the monitor means 5 stops the read operation of the information read means 2.

A description will now be given of preferred embodiments of the present invention with reference to the accompanying drawings.

The embodiments described below use, as the storage medium M, a laser vision disk (hereinafter simply referred to as LD) which is a video disk and stores information which is read by projecting a laser beam spot onto the video disk. In the LD, there are stored video information containing audio information, and a variety of information recorded in an information section (vertical blanking) corresponding to predetermined scan lines arranged in the vertical interval of the video signal, such as a frame number, a chapter number, a control code and motion information. In one LD sheet, a plurality of video programs, each amounting to a few minutes to tens of minutes and being assigned the chapter number serving as the identification information.

The recorded video programs are, for example, video images taken on a Jet-coaster or a boat going down a mountain stream, an SFX (special effect), computer graphics and moving pictures like animation. In synchronism with motions in the images, motion information which is measured or calculated beforehand is converted into oil pressure control information, which is to be sent to an oil pressure servo mechanism. For the jet-coaster, for example, the motion information shows various motions of the mechanism based on a real ascent or descent of the jet-coaster, such as upward and downward motions, acceleration, and motions or tilts in the back, forth, right and left directions. The converted oil pressure control information is recorded in the information area corresponding to the aforementioned vertical interval of the video signal.

FIRST EMBODIMENT

Figure 2A:
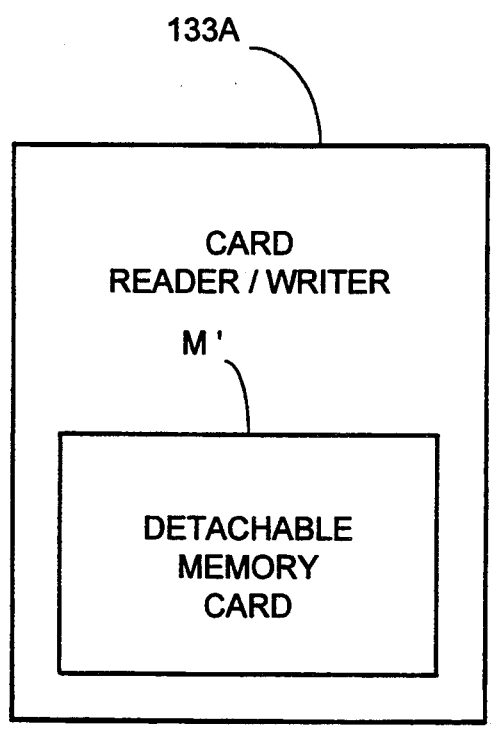
FIG. 2A is a diagram of the card reader writer of FIG. 2.

FIG. 2 is a diagram showing the structure of an embodiment of the present invention. Referring to FIG. 2, an LD player 11 reproduces information recorded on the LD. An automatic LD changer 12 houses a plurality of LDs, and executes loading and unloading operations on the specified LD. A control device 13 stores, beforehand, the title, disk number and chapter number of each of the LDs housed in the automatic LD changer 12, and has a front panel on which there are provided a setting input key area 131, a guidance display screen 132, and a card reader/writer 133. In the setting key area 131, there are arranged a video program select key, a start switch, a repeat setting key, a random select key and so on. A variety of guidance information is displayed on the guidance display screen 132. The card reader/writer 133 carries out read and write operations on a detachable memory card such as an IC card and a magnetic card as shown in FIG. 2A, in which a detachable memory card M' (constituting the storage medium M of FIG. 1) is depicted detachably set in a card reader/writer 133A (constituting the information read means 2 of FIG. 1). The control device 13 executes various control procedures, as will be described later. A video display device 14 which corresponds to the aforementioned display means 3, displays video information played back by the LD player 11. An audio device 15 functioning as an audio reproduction means outputs audio information reproduced by the LD player 11. A capsule 17 houses a seat 16, the video display device 14 and the audio device 15. A capsule moving device 18, which corresponds to the aforementioned motion means 4, moves the capsule 17 in all directions, and has a driving shaft (not shown) supporting the capsule 17, and an oil pressure mechanism (not shown) for controlling the motion of the driving shaft. According to an oil pressure signal reproduced by the LD player 11, the capsule moving device 18 moves and tilts the capsule 17 in the front, back, left, right, up and down directions within a predetermined range. The LD player 11, the automatic LD changer 12 and the control device 13 in the above-mentioned structure form the housing means, information read means, the information select means and the monitor means. Although the video display device 13 may be an ordinary television set, but it is preferable to use a projection television set in order to use a wide display plan and increase feelings as if real.

In the above-mentioned structure, a person who will board the capsule 17 inserts a prepaid card, such as a magnetic card or an IC card, into the card reader/writer 133. The control device 13 executes an accounting procedure and other necessary procedures. A list of the video programs recorded on the LDs is displayed on the guidance display screen 132 of the control device 13. The passenger selects a favorite video program via the video program select key disposed in the setting input key area 131. In response to this key operation, the control device 13 sends, to the automatic LD changer 12, the disk number of the LD on which the selected video program recorded, and loads the LD in the LD player 11. Then, the control device 13 outputs the chapter number of the selected video program to the LD player 11, which reproduces information of the selected video program. The reproduced information is decoded by the control device 13. The video information contained in the reproduced information is sent to the video display device 14, and the audio information therein is sent to the audio device 15. Further, the motion information contained in the reproduced information is sent to the capsule moving device 18. Thereby, the passenger seated on the seat 16 enjoys the video images displayed on the video display device 14 while being moved together with the seat 16 in synchronism with motions in the images by means of the capsule moving device 18. In this manner, the person in the capsule 17 can enjoy the video program.

Figure 3:
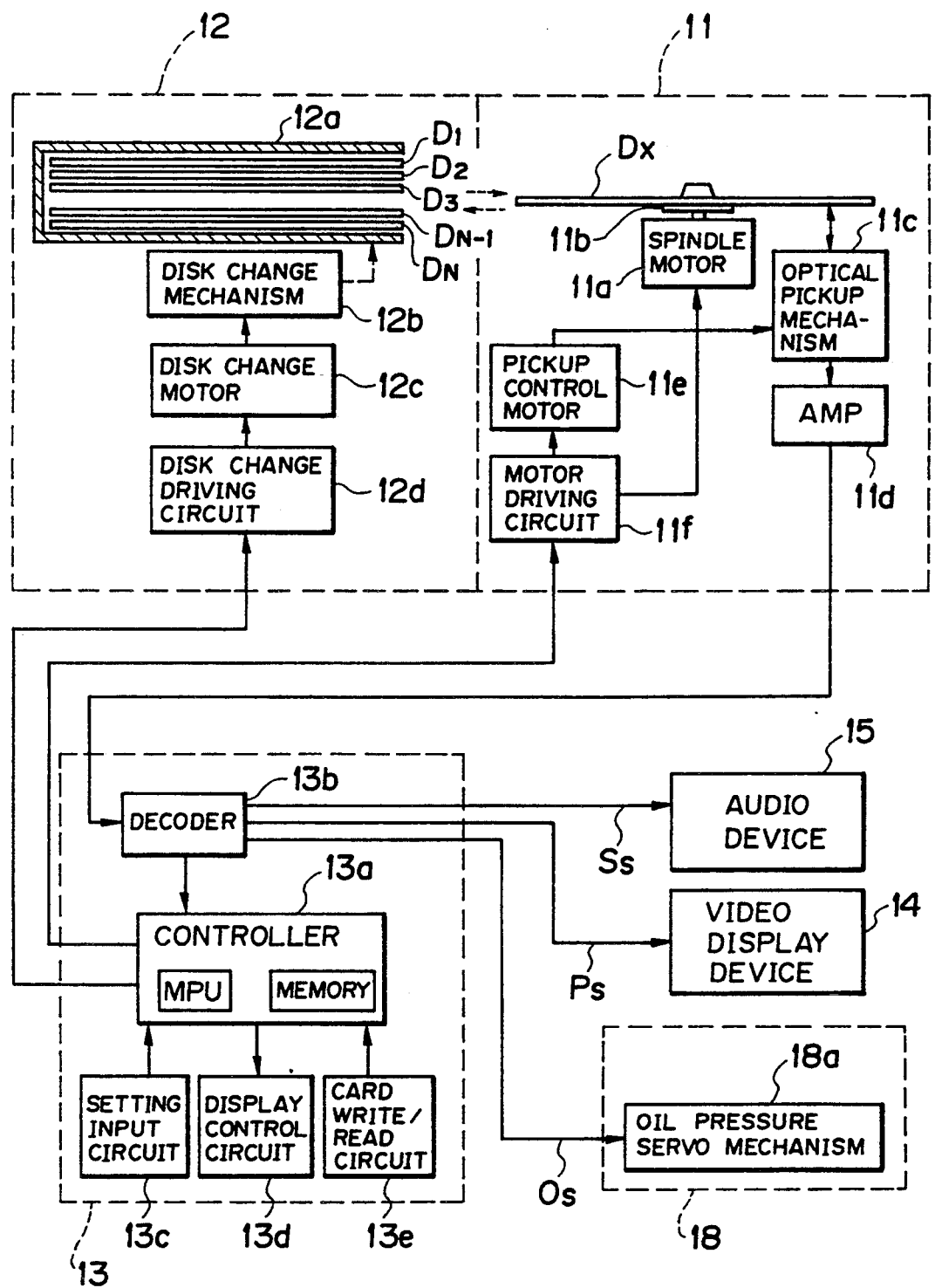
FIG. 3 is a block diagram of a control system used in first through fourth embodiments of the present invention.

FIG. 3 is a block diagram of a control system in the above-mentioned structure. As shown in FIG. 3, the LD player 11 comprises a spindle motor 11a turning the LD, a turn table 11b which is fixed to a rotary shaft of the spindle motor 11a and which carries the LD, an optical pickup mechanism 11c which includes an optical pickup for emitting and receiving a laser beam and various servo mechanisms and which reads information recorded on the LD, an amplifier 11d amplifying a read signal from the optical pickup mechanism 11c, a pickup control motor 11e which controls a slider (not shown) supporting the optical pickup and moving it in the radial direction of the LD, and a motor driving circuit 11f that drives the spindle motor 11a and the pickup control motor 11e. When data showing the chapter number is input to the motor driving circuit 11f, the motor driving circuit 11f controls the pickup control motor 11e so that the optical pickup is moved to a starting track position of the chapter number. Then a read control of the recorded information specified by the input chapter number is started, and an amplified read signal is output from the amplifier 11d.

The automatic LD changer 12 comprises a magazine 12a, a disk change mechanism 12b, a disk change motor 12c and a disk change driving circuit 12d. The magazine 12a houses a plurality of LDs ($D_1, D_2, \ldots, D_{N-1}, D_N$), which are sequentially arranged at predetermined pitches. The disk change mechanism 12b transports the specified one of the LDs in the magazine 12a to the turn table 11b and clamps it thereon. Further, the disk change mechanism 12b takes the LD on the turn table 11b and places it in position. The disk change motor 12c is a driving source of the disk change mechanism 12b.

The disk change driving circuit 12d drives the disk change motor 12c. The disk change driving circuit 12d receives data showing the disk number of the LD, and controls the disk change motor 12c so that the LD having the input disk number is selected after another LD is returned to the magazine 12a if it has been set in the LD player 11, and is transported to and placed on the turn Gable 11b.

The control device 13 comprises a controller 13a, a decoder 13b, a setting input circuit 13c, a display control circuit 13d and a card write/read circuit 13e. The controller 13a is implemented with a microcomputer having a processor (MPU), a ROM (Read Only Memory) and a RAM (Random Access Memory). The decoder 13b includes an FM demodulating circuit and a digital information separation circuit, and decodes the read signal from the LD player 11 into a video signal Ps, an audio signal Ss, an oil pressure signal Os and the chapter number, which is digital information. Then the decoder 13b outputs the video signal Ps, the audio signal Ss and the oil pressure signal Os to the video display device 14, the audio device 15 and the capsule moving device 18, respectively. The setting input circuit 13c manages the inputting of the setting input keys 131. The display control circuit 13d controls a display on the guidance display screen 132. The card write/read circuit 13e controls the card reader/writer 133. The controller 13a has a memory which stores, management information, the titles, disk numbers and chapter numbers of all the video programs recorded on the LDs housed in the automatic LD changer 12.

The capsule moving device 18 includes an oil pressure mechanism 18a, which drives a driving shaft (not shown) supporting the capsule 17. The oil pressure mechanism 18a receives the oil pressure signal Os output from the decoder 13b, and controls the driving of the driving shaft in accordance with the oil pressure signal Os.

Figure 4:
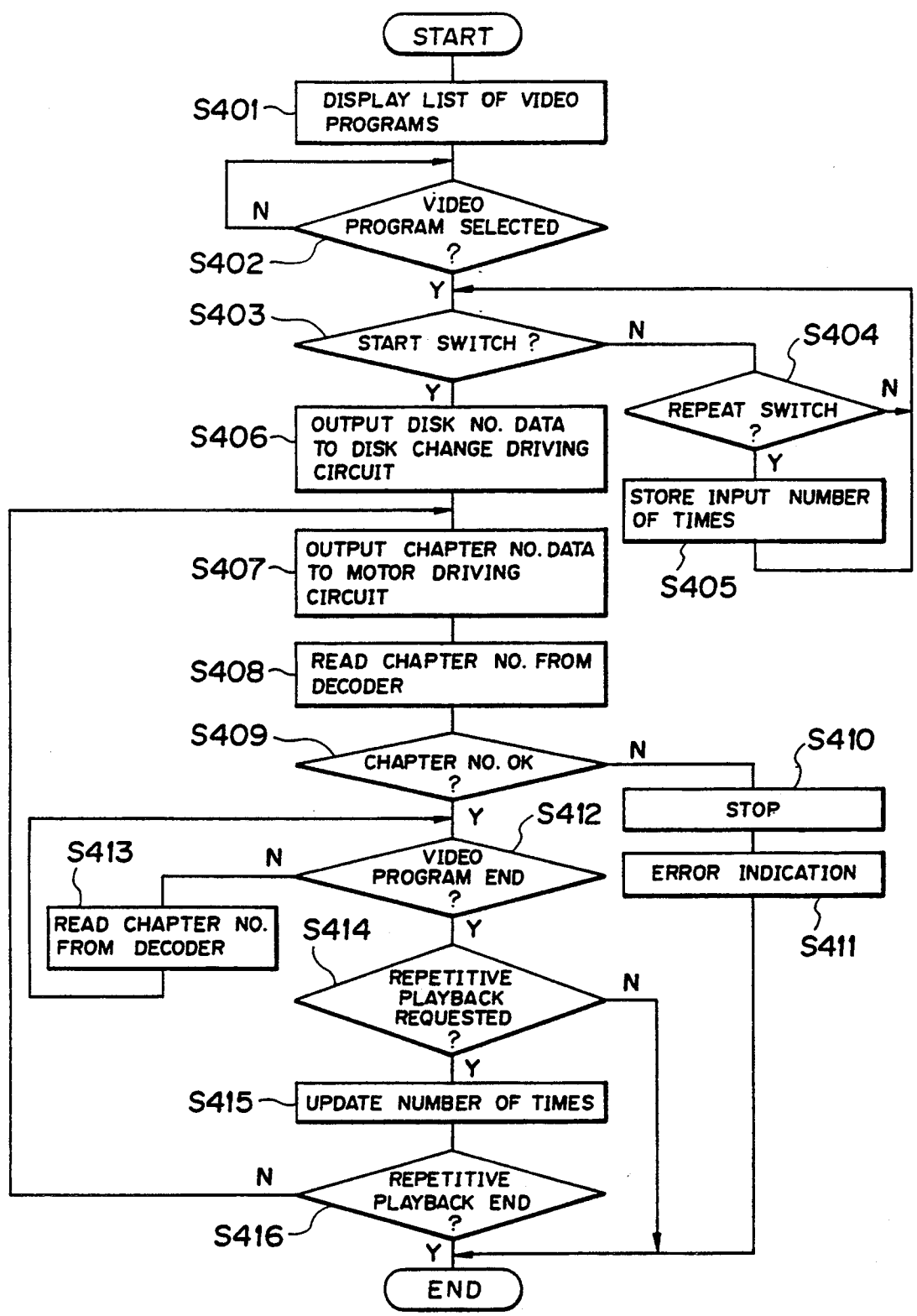
FIG. 4 is a flowchart showing a control procedure in the first embodiment of the present invention.

FIG. 4 is a flowchart of a video program playback control process executed by the controller 13a. A description will now be given of the video program playback process with reference to FIG. 4.

The controller 13a makes a list of the video programs stored in the built-in memory, and displays the list on the guidance display screen 132 (S401 and S402). In this manner, the controller 13a calls a passenger's attention to the key inputting. When a video program is selected by the video program select key in the setting input key area 131, the controller 13a stores the information about the selected video program, and checks the inputting via the start switch or the repeat setting switch (S403 and S404). When it is determined, in step S404, that the repeat setting switch has been operated, the controller 13a stores subsequent data showing the number of times that the video program is repeatedly played back.

When it is determined that the start switch has been operated, the controller 13a outputs to the disk change driving circuit 12d the disk number of the LD on which the selected video program is recorded (S406), and has the selected LD loaded in the LD player 11. After the selected LD is loaded in the LD player 11, the controller 13a outputs the chapter number of the selected video program to the motor driving circuit 11f (S407). With this operation, information about the selected video program can be read out from the selected LD. The controller 13a receives, via the decoder 13b, the chapter number of the video program from the readout information, and decides whether or not the selected video program is being played back (S408 and S409). If a video program different from the selected video program is being played back, the controller 13a executes a stop procedure for the motor driving circuit 11f, and subsequently displays a playback error on the guidance display screen 132 (S410 and 411). Then the controller 13a ends the process.

When the selected video program is being played back correctly, the controller 13a reads the chapter number from the decoder 13b, and determines whether or not the playback of the selected video program has been completed (S412 and S413). When it is determined that the playback of the selected video program has been completed, the controller 13a discerns whether or not the repetitive playback of the video program has been requested (S414). When the repetitive playback of the video program has not been requested, the controller 13a ends the program. When the repetitive playback of the video program has been requested, the video program is repeatedly played back by the number of times specified in step S404. Each time the video program is played back, data showing the number of times that it is repeatedly played back is updated (S415). When it is determined, in S416, that the video program has been repeatedly played back by the specified number of times, the controller 13a ends the process. On the other hand, when it is determined that the video program has not yet been repeatedly played back by the specified number of times, the controller 13a returns to step 407 in which step the chapter number of the video program is output to the motor driving circuit 11f again.

In the manner as described above, according to the present embodiment, a desired video program can be selected, via the video program select key, from among the video programs recorded on the LDs housed in the automatic LD changer 12, and in response to this selection, the automatic LD changer 12 and the LD player 11 start to operate automatically, so that the desired video program is automatically selected and played back. Further, the motion information recorded together with the video program is read at the same time as the video information, so that the images are reproduced while the capsule 17 is moved in all directions in synchronism with the motions in the images. Furthermore, it is possible to freely set the repetitive playback of the video program and automatically play back the video program repeatedly. Moreover, since the chapter number of the video program played back by the LD player 11 is monitored, the playback of the video program can be automatically stopped if a video program different from the selected video program is played back.

With the above structure, it becomes possible for the passenger to select a desired video program from among the various video programs and easily enjoy a pseudo-experience repeatedly as if real.

In the above embodiment, the automatic LD changer 12 is used in order to easily enjoy a larger number of video programs. It is alternatively possible to manually replace the LD by another one without the automatic LD changer. If video programs, each having a playback time equal to 10 to 20 minutes, are recorded on both sides of an LD having a total recording time of two hours, 5 to 10 video programs can be recorded on the LD. Hence, it is possible to enjoy various video programs even by one LD.

SECOND EMBODIMENT

A description will be now given of the second embodiment of the present invention.

Figures 5A, 5B:
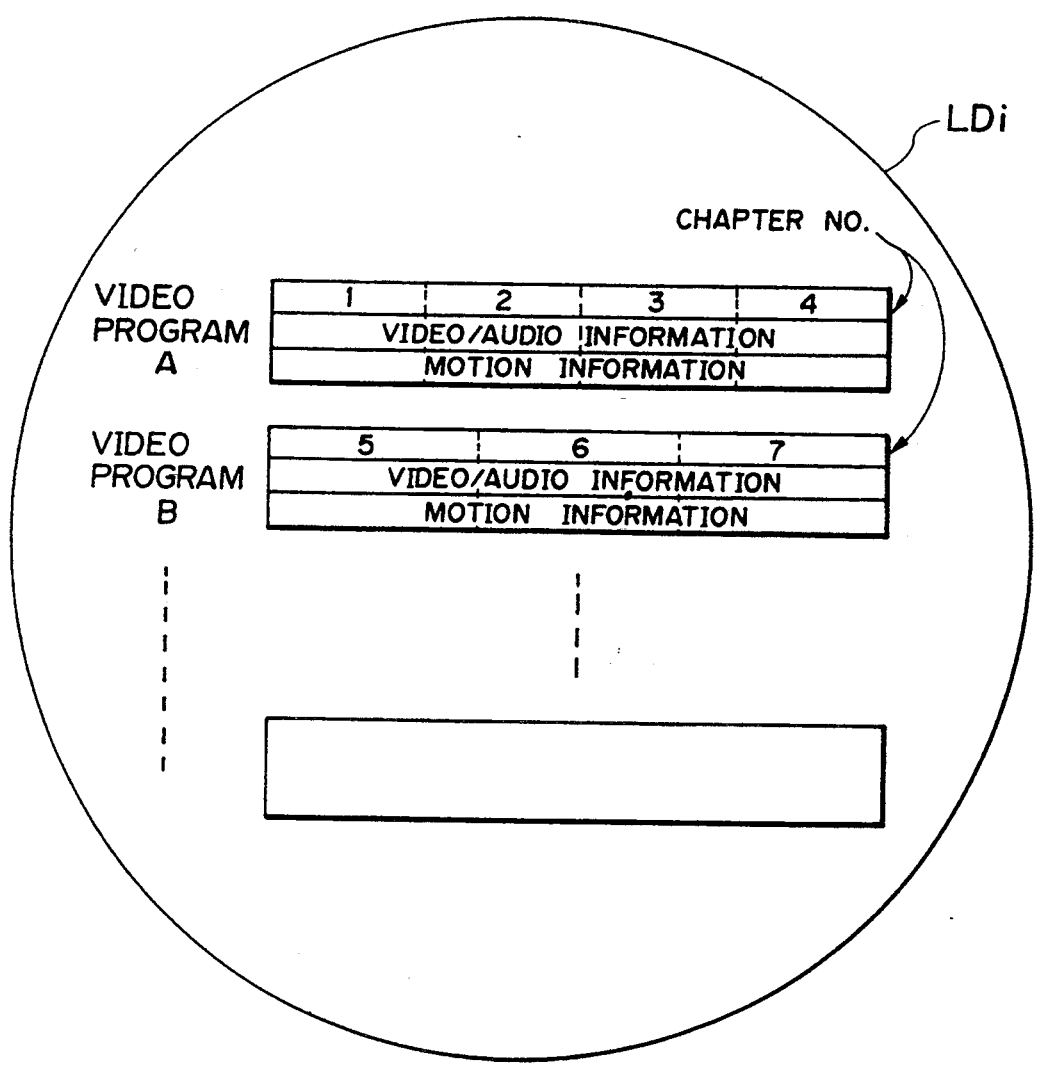
FIG. 5A and 5B are diagrams showing an LD used in the second through fourth embodiments of the present invention, respectively.

FIG. 5A is a diagram showing the recording status of video programs recorded on an LD used in the second embodiment of the present invention, and the third and fourth embodiments of the present invention which will be described later. As shown in FIG. 5A, each of the video programs recorded on the LD used in the second through fourth embodiments of the present invention is divided into a plurality of sections, each of which is assigned a chapter number. It is thus possible to access each of the divided video program sections at random. The video program of the jet-coaster is divided into, for example, a plurality of stages, such as an ascent or descent stage, a loop stage and a descent/water-obstacle/ascent stage. It is possible to arbitrarily determine the order of playback of the divided video program sections and hence program different series of stories.

The structure of the second embodiment of the present invention is the same as that of the first embodiment shown in FIGS. 2 and 3, and the description previously given with reference to these figures holds true for the second embodiment. The controller 13a, which manages the LDs on which the video programs are recorded according to the second embodiment, stores management information as shown in FIG. 5B. For each of the video programs, the management information contains, as program section identifying information, the chapter numbers of a series of stories which are to be played back.

Figure 6:
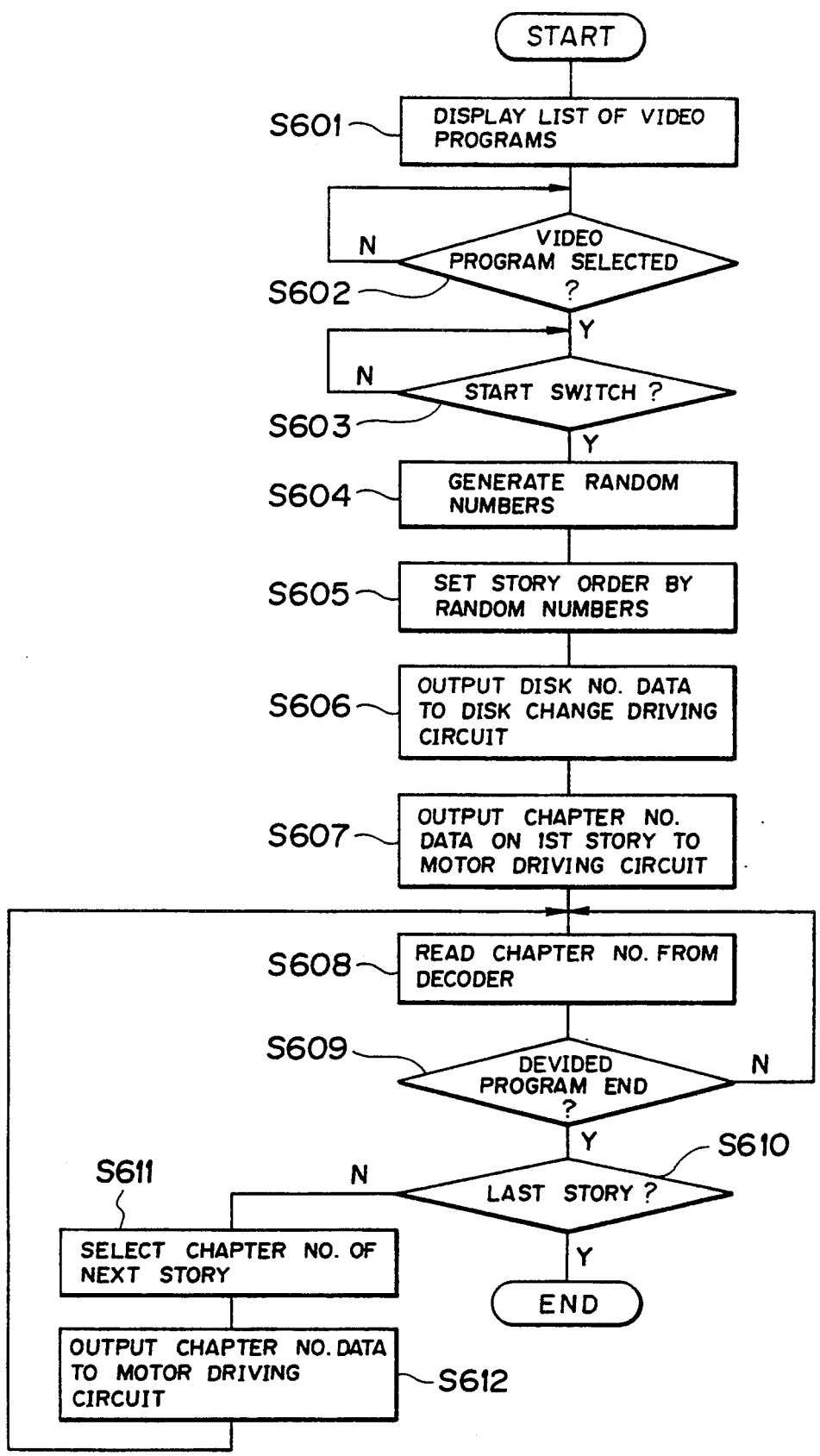
FIG. 6 is a flowchart showing a control procedure in the second embodiment of the present invention.

FIG. 6 is a flowchart of a video program playback control process executed by the controller 13a of the second embodiment. A description will now be given of the video program playback process with reference to FIG. 6.

The controller 13a displays a list of the video programs stored in the built-in memory on the guidance display screen 132 in order to call the passenger's attention to the key inputting. In response to the key input, the controller 13a stores, in the memory, information about a video program selected by the key inputting in the memory, and waits for the key operation of the start switch (S601 and S602).

When the start switch is operated, the controller 13a generates random numerals, and determines the order of playback of the divided video program sections to be played back (hereinafter each of the program sections is also referred to as a "story") (S604 and S605). For example, the controller 13a generates random numbers in the range of 0 to 9, and arranges the chapter numbers in the order of occurrence of random numerals 1 to 4 if the chapter numbers of the divided video program sections contained in the video program information are 1 to 4. The playback order of the stories thus determined is stored as an arrangement of chapter numbers.

The controller 13a outputs the disk number of the LD on which the selected video program is recorded to the disk change driving circuit 12d, which loads the specified LD in the LD load player 11. After the specified LD is set in the LD player 11, the controller 13a outputs to the motor driving circuit 11f the chapter number of the first story (divided video program section) of the selected video program (S606 and S607). Then, the first story is played back. The controller 13a reads, via the decoder 13b, the chapter number of the played-back story contained in the reproduced information, and waits for the completion of playback of the story (S608 and S609).

When the playback of the story has been completed, the controller 13a compares the order of the stories determined in step S605 with the chapter number of the story which was being played back, and determines whether or not the playback of the last story has been completed (S610). When the result in step S610 is YES, the controller 13a ends the process. When the result in step S610 is NO, the controller 13a selects the chapter number of the next story, and outputs it to the motor driving circuit 11f (S611 and S612). Then, the controller 13a returns to step S608 and waits for the completion of playback of the story selected in step S611. The above procedure is repeatedly carried out until all the stories have been reproduced.

Figure 7A:
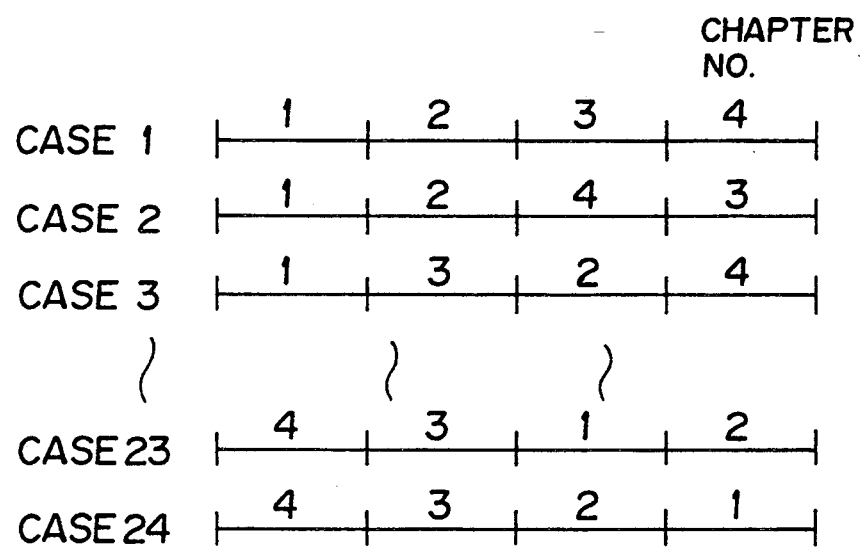
FIG. 7A and 7B are diagrams for explaining a story order in the embodiments of the present invention, respectively.

As described above, the second embodiment of the present invention uses an LD in which one video program is divided into a plurality of sections which can be accessed at random, and determines the order of playback of the stories by using the random numerals at the time when the video program is selected. If a video program is divided into four sections as shown in FIG. 7A, there are 24 different orders of playback. Each time the video program is selected, any one of the 24 combinations is selected at random by using the random numerals. Even if the same video program is selected again, there is an extremely little possibility that the same story pattern as the previous one is determined. Hence, the passenger will have an impression different from the previous one even if the same video program is selected again, and can repeatedly enjoy the same video program without getting tired of it. The second embodiment of the present invention is particularly effective to a case where there is a small number of video programs which can be selected or the passenger has a limited liking for video programs regarding, for example, vehicles.

Figure 7B:
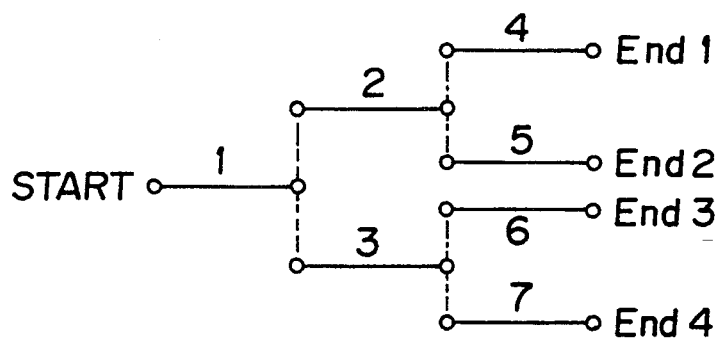

Regarding the playback of the video program having the divided program sections, it is not necessary to play back all the divided video program sections, but possible to select a predetermined number of video program sections from among all the sections and hence create a new story pattern. For example, as shown in FIG. 7B, it is possible to select three of the four divided video program sections and create a story pattern consisting of the three divided video program sections. In this manner, it becomes possible to provide a larger number of story patterns and hence provide a wider variety of the video program. It is also possible to give a much wider variety to the single video program by storing the previously played-back story patterns and creating a story pattern consisting of a number of stories different from the numbers of the previously played-back story patterns each time the same video program is selected. It is also possible to create and store a plurality of story patterns beforehand and select one of the stored story patterns at random.

THIRD EMBODIMENT

A description will now be given of the third embodiment of the present invention.

As in the case of the second embodiment of the present invention, the third embodiment uses an LD in which each video program is divided into a plurality of sections, each of which is assigned the chapter number in order to access the divided sections at random.

The third embodiment has the same structure as that shown in FIGS. 2 and 3, and the description given with reference to these figures holds true for the third embodiment. The controller 13a used in the third embodiment stores the management information about each video program comprised of divided sections in the same manner as the controller 13a of the second embodiment.

Figure 8:
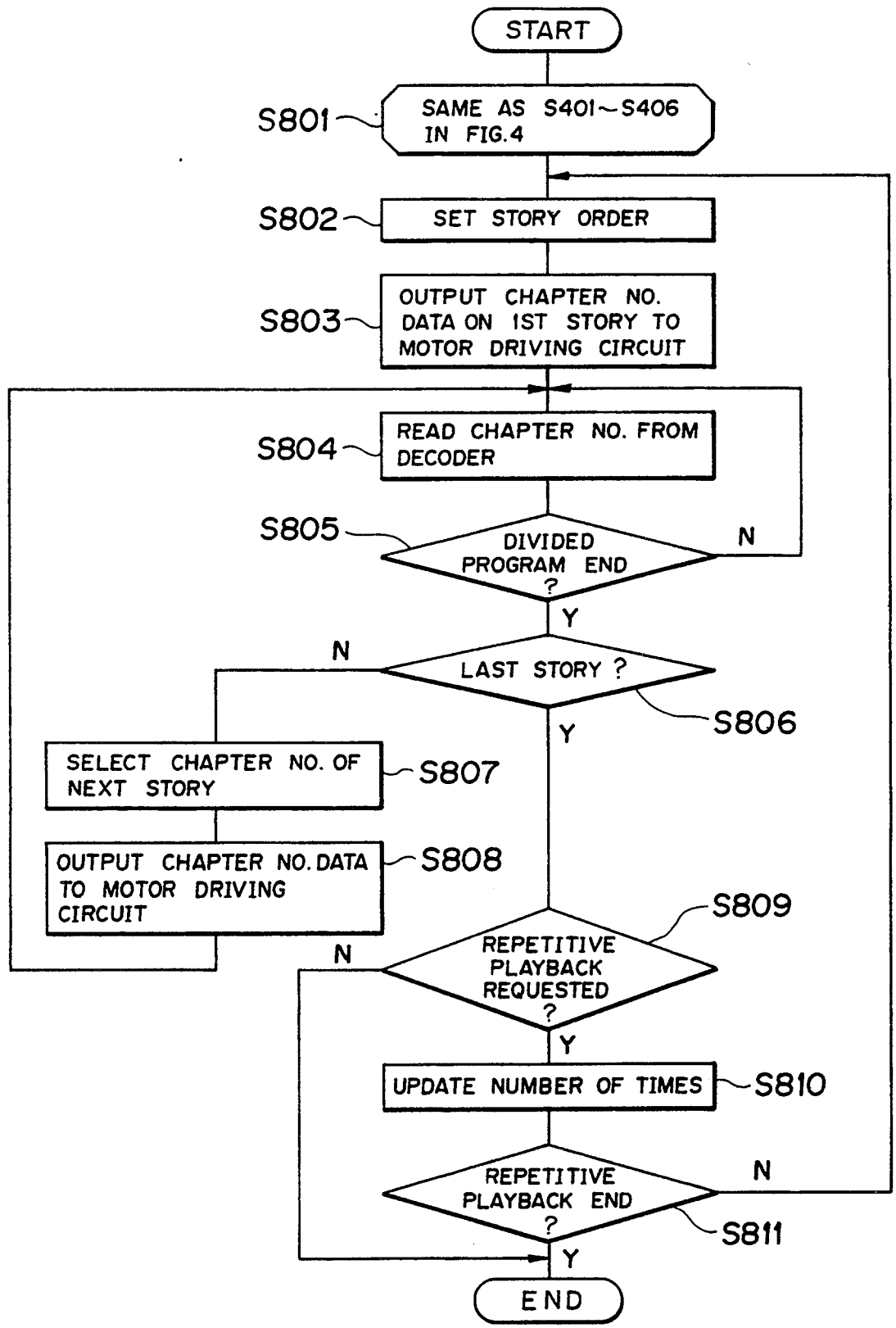
FIG. 8 is a flowchart showing a control procedure in the third embodiment of the present invention.

FIG. 8 is a flowchart of a video program playback control process executed by the controller 13a according to the third embodiment of the present invention. The video program playback process of the third embodiment will now be described with reference to FIG. 8.

Step S801 is a process identical to that executed in the steps S401-S406 of the first embodiment shown in FIG. 4. That is, the controller 13a displays a list of the video programs stored in the built-in memory on the guidance display screen 132 in order to call the passenger's attention to key inputting. In response to a program selection via the program select key, the controller 13a stores, in the built-in memory, information containing the chapter numbers of the divided sections of the selected video program, and checks whether or not the start switch or the repeat setting switch has been operated. If the repeat setting switch has been operated, the controller 13a stores information indicative of a requested number of times that the video program should be repeatedly played back. Then the controller 13a outputs to the disk change driving circuit 12d the disk number of the LD on which the selected video program is recorded, and the selected LD is loaded in the LD player 11.

Thereafter, regarding the selected video program, a desired story order in which the divided video program sections are sequentially played back, is set (S802). The setting of the story order can be carried out by sequentially reading a plurality of predetermined story orders prepared beforehand or selecting one of the predetermined orders at random.

After the story order is set, the controller 13a outputs the chapter number of the first story (divided video program section) to the motor driving circuit 11f (S803), and then the first story of the selected video program is played back. The controller 13a reads the chapter number of the played-back story from the output signal of the decoder 13b, and determines whether or not the readout chapter number coincides with the chapter number used in step S803 (S803 and S804). Then, the controller 13a waits for the completion of playback of the first story.

When the story has been completely played back, the controller 13a determines whether or not the last story has been completed by comparing the chapter number the story which was being played back with the story order set in step S802 (S806). When the result obtained in step S806, the controller 13a receives the chapter number of the next story, and outputs it to the motor driving circuit 11f (S807 and S808). Then, this story is played back. The controller 13a proceeds to step S804 in which step the controller 13a waits for the completion of playback of this story. The above-mentioned procedure is repeatedly carried out until all the specified stories have been played back.

When all the stories have been completely played back, the controller 13a determines whether or not the repetitive playback has been requested (S809). When the repetitive playback has not been requested, the controller 13a ends the control process. When the repetitive playback has been requested, the controller 13a updates the number of times that the selected video program has been repeatedly played back (S810, S811). When the video program has not yet been repeatedly played back the requested number of times, the controller 13a returns step S804 in which step the story order is set. When the video program has been played back the requested number of times, the controller 13a ends the control process.

In the third embodiment described above, by setting the number of times that the selected video program should be repeatedly played back, the same video program is automatically played back repeatedly. In this case, each time the selected video program is repeatedly played back, a different story order is determined by using the chapter numbers assigned to the divided video program sections. In this manner, a different story derived from the single video program can be created each time it is repeatedly played back. As a result, the passenger can repeatedly enjoy the single video program the requested number of times and will have different impressions since a different story order is determined each time the selected video program is repeatedly played back.

FOURTH EMBODIMENT

A description will now be given of the fourth embodiment of the present invention.

As in the case of the second and third embodiments, the fourth embodiment uses an LD in which each video program is divided into a plurality of sections, each of which is assigned the chapter number in order to access the divided sections at random.

The fourth embodiment has the same structure as that of the first embodiment shown in FIGS. 2 and 3, the related description thereof holds true for the fourth embodiment. The controller 13a holds management information about the video programs. In the fourth embodiment, an IC card is used as the prepaid card. When the IC card is issued, an ID of the user and data indicating prepaid money or the remainder thereof are recorded thereon. In addition, a story area for recording information about a video program which has been executed and a story order of the executed video program is formatted on the IC card.

Figure 9:
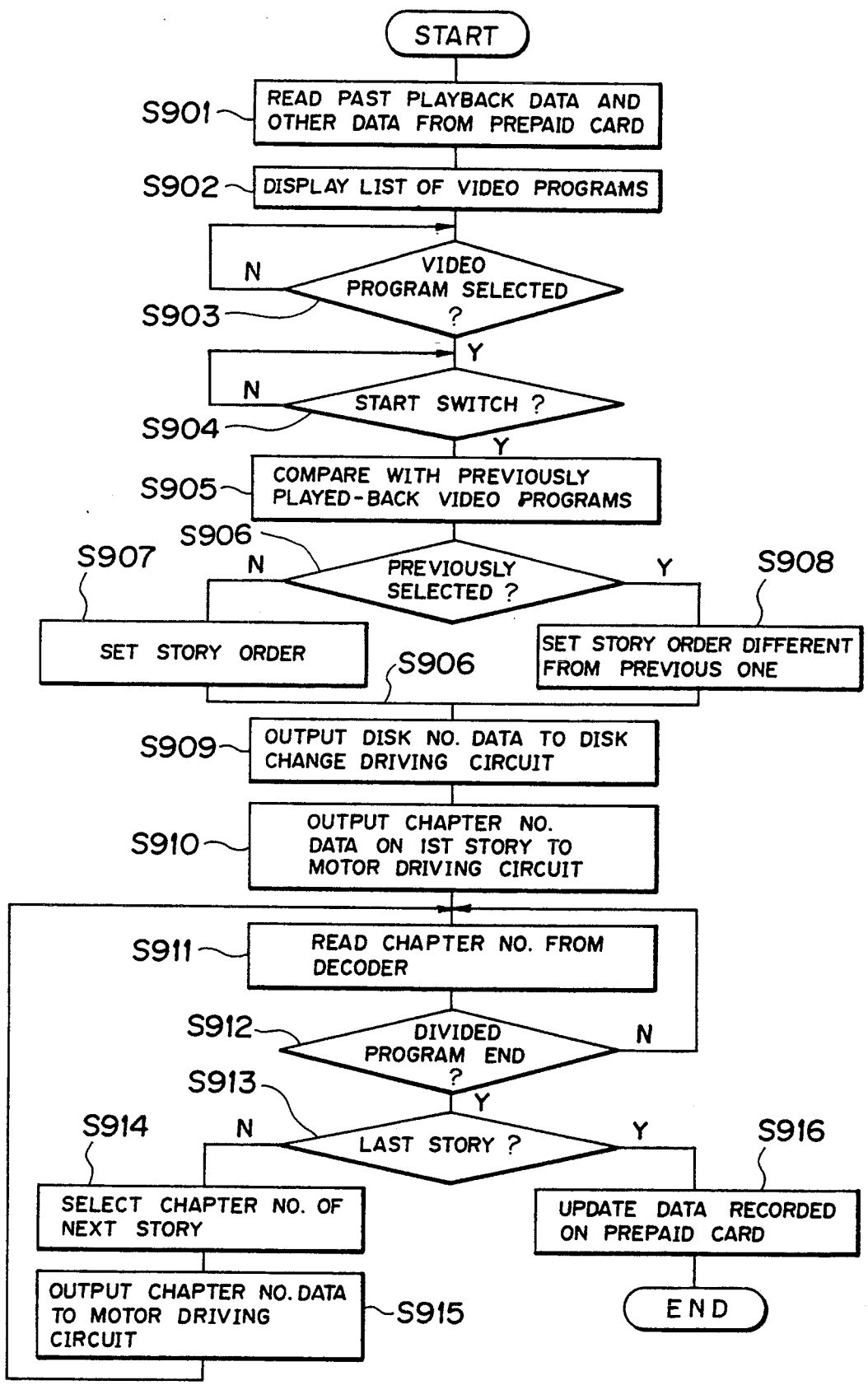
FIG. 9 is a flowchart showing a control procedure in the fourth embodiment of the present invention.

FIG. 9 is a flowchart of a video program playback control process executed by the controller 13a according to the fourth embodiment of the present invention. The video program playback process of the present embodiment will now be described with reference to FIG. 9.

The controller 13a reads out the ID of the user, the remainder of the prepaid money, and if any, information about the video programs which have been executed and the story orders thereof from the prepaid card inserted into the card reader/writer 133 (S901).

Next, the controller 13a displays, in the form of the list, information about the video programs stored in the memory on the guidance display screen 132 (S902). Then the controller 13a waits for selection of the video program by the passenger (S903). When one of the video programs is selected, the controller 13a stores information about the selected video program, and waits for inputting by the start switch (S904).

After the start switch is operated, the controller 13a compares the video program currently selected with the video programs which were previously played back (S905). Then the controller 13a determines whether or not the currently selected video program is the same as one of the previously selected video programs (S906). When the video program currently selected is different from the previously selected video programs, the controller 13a sets the story order of the currently selected video program at random (S907). When the video program currently selected is the same as one of the previously selected video programs, the controller 13a refers to the story order of the previously selected video program and sets a story order different from the previous one at random (S908).

After setting the story order of the selected video program, the controller 13a outputs, to the disk change driving circuit 12d, the disk number of the LD on which the selected video program is recorded, and has the above LD loaded in the LD player 11 (S909). Then, the controller 13a outputs the chapter number of the first divided section of the story order set in step S907 or S908 to the motor driving circuit 11f (S910), so that the first story of the selected video program is played back. The controller 13a reads the chapter number of the played-back story from the played-back information via the decoder 13b (S911). Then, the controller 13a determines whether or not the divided program section has been completely played back while referring to the chapter number (S912).

When it is determined that the story has been completely played back, the controller 13a determines that the last story has been completely played back (S913). When playback of the last story has not yet been completed, the controller obtains the next chapter number and outputs it to the motor driving circuit 11f and has the next story played back (S914 and S915). The controller 13a returns to step S911, and waits for completion of playback of the story selected in step S914. This sequence is repeatedly carried out until the last story has been completely played back.

When all the stories have been played back, the controller 13a updates data indicative of the remainder of the prepaid money recorded on the prepared card and records information indicating the story order of the video program selected this time on the prepaid card (S916).

As has been described above, according to the fourth embodiment, it is checked whether or not the selected video program is the same as one of the previously selected video programs, and a story order different from the previously selected story order is determined. Since the previously selected story order is recorded on the prepaid card, even if the same video program as previously selected is selected, the passenger will enjoy the video program with different impressions.

FIFTH EMBODIMENT

A description will now be given of the fifth embodiment of the present invention.

Figure 10:
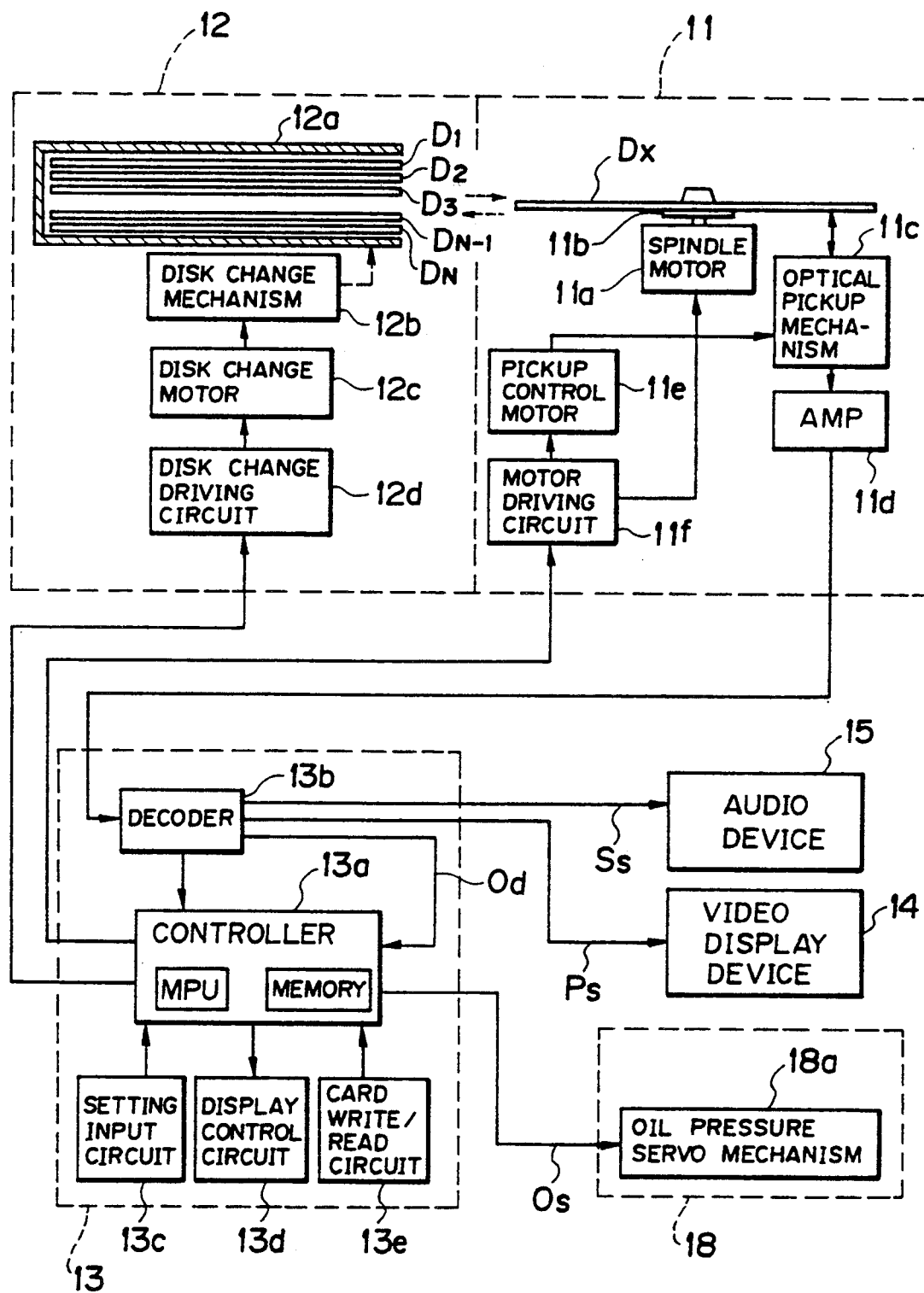
FIG. 10 is a block diagram of a control system used in a fifth embodiment of the present invention.

FIG. 10 is a block diagram of a control system of the fifth embodiment of the present invention. The fifth embodiment has a structure identical to that shown in FIG. 2 and the description thereof holds true for the fifth embodiment. The control system of the fifth embodiment differs from that shown in FIG. 3 in that the controller 13a receives oil pressure data Od obtained by decoding oil pressure control information read by the LD player 11 and outputs, to the oil servo mechanism 18, an oil pressure signal Os obtained by executing a predetermined operation on the oil pressure data Od. The other structural parts of the fifth embodiment are the same as those shown in FIG. 3. In the fifth embodiment, a degree of motion of the capsule 17 dependent on the weights and ages of the passengers is registered in a motion-degree table formed in the controller 13a beforehand, and the capsule 17 is controlled by adjusting the oil pressure data to be supplied to the capsule moving device 18 so that the capsule 17 is moved in all directions at a degree of motion suitable for input data showing the weight and age of the passenger.

FIG. 11 shows a flowchart of video program playback control process executed by the controller 13a according to the fifth embodiment of the present invention. The video program playback process according to the present embodiment will now be explained by referring to the flowchart.

The controller 13a displays the list of the video programs (SA01), and determines whether or not a video program has been selected out of them (SA02). The controller 13a controls the guidance display screen 132 so that a message requesting to input the weight and age of the passenger is displayed thereon. The controller 13a stores the weight and age input by the setting input keys 131 in the built-in memory (SA03). Then, the controller 13a waits for inputting via the start switch (SA04).

Subsequently, the controller 13a outputs, to the disk change driving circuit 12d, the disk number of the LD on which the selected video program is recorded (SA05). The disk change driving circuit 12d loads the specified LD in the LD player 11. When the setting of the LD in the LD player 11 has been completed, the controller 13a outputs the chapter number of the selected video program to the motor driving circuit 11f, so that information about the selected video program is reproduced (SA06).

The controller 13a reads the oil pressure data via the decoder 13b, and selects the degree of motion corresponding to the input weight and age from the motion-degree table (SA07). The controller 13a adjusts the oil pressure data on the basis of the degree of motion, and outputs adjusted oil pressure data to the oil pressure servo mechanism 18a (SA08). The controller 13a reads the chapter number via the decoder 13b (SA09) and determines, on the basis of the read chapter number, whether or not the selected video program has been completely played back (SA10). A sequence starting from step SA07 is repeatedly carried out until the selected video program has been completely played back.

As described above, according to the fifth embodiment of the present invention, information about the motion recorded on the LD is adjusted on the basis of the weight and age of the passenger, and adjusted information is output to the oil pressure servo mechanism 18a. Hence, for a person who heavy, an increased degree of motion is used in order to cancel a decrease in the degree of motion. For a person who is light, and a reduced degree of motion is used in order to prevent an excessive degree of motion. When a low-age child or an advanced-age person boards the apparatus, the degree of motion is reduced to provide comfortable riding. Meanwhile, an increased degree of motion can be presented to a person who likes a violent motion. In this manner, the present embodiment changes the degree of motion on the basis of the weight and age which cause different motion feelings, and presents desired motion feelings requested by the boarding individuals.

In the above fifth embodiment, the weight and age are input by the setting input key panel 131. Alternatively, it is possible to read data about the weight and age of the passenger recorded on the prepaid card beforehand. It is also possible for the passenger to input a desired degree of motion by the setting input key 131 or record it on the prepaid card beforehand.

As has been described above, the present invention is made so that it is possible to provide for a variety of video and motion information by means of a storage means, such as the automatic LD changer, easily select desired video and motion information and play back a selected video program with a corresponding motion of the seat on which the passenger sits. With the above structure, it becomes possible to easily enjoy various video programs as if the passenger is really present in the scene being played back.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus comprising:
   a storage medium storing a plurality of video and motion information pieces, each including at least one of a video information, a motion information associated with said video information and an identification information for identifying the video information;
   information select means for specifying the identification information about a video and motion information piece which is one of the vide and motion information pieces and which is to be read;
   information read means for reading, from said storage medium, the video and motion information piece related to the identification information specified by said information select means;
   display means for displaying the video information included in the video and motion information piece read by said information read means;
   motion means for performing a predetermined motion based n the motion information included in the video and motion information piece read by said information read means; and
   monitor means for monitoring the identification information included in the video and motion information piece read by said information read means and for stopping a read operation of said information red means when the identification information included in said video and motion information piece is different from the identification information specified by said information select means, wherein:
   said video and motion information stored in said storage medium includes a plurality of divided video and motion information sections, each including a divided identification information piece for identifying one of said divided video and motion information sections;
   said information select means comprises means for sequentially specifying divided identification information sections of the video and motion information which is to be read;
   said information read means comprises means for sequentially reading the divided video and motion information sections related to the divided identification information pieces sequentially specified by said information select means; and
   said monitor means comprises means for monitoring the divided identification information pieces relating to the divided video and motion information sections read by said information read means and for stopping a read operation of said information read means when the divided identification information pieces monitored are different from the respective, divided identification information pieces specified by said information select means.

2. An apparatus as claimed in claim 1, wherein:
   said apparatus comprises housing means for housing a plurality of storage media, each being the same as said storage medium; and
   said information read means comprises means for selecting one of the storage media in which the video and information motion related to the identification information specified by said information select means is stored and for reading the video and motion information related to said identification information from said one of the storage media.

3. An apparatus as claimed in claim 1, wherein said information select means comprises means for sequentially specifying a predetermined number of divided identification information pieces relating to the divided video and motion information sections which are to be read.

4. An apparatus as claimed in claim 1, wherein said information select means comprises means for setting a different specifying order of the divided identification information pieces relating to the video and motion information which is to be read each time said vide and motion information is read.

5. An apparatus as claimed in claim 1, wherein said information select means comprises means for setting a different number of divided identification information pieces of the video and motion information which is to be specified each time said video and motion information is read.

6. An apparatus comprising:
   a video disk storing a plurality of video and motion information pieces, each including at least one of a video information, a motion information associated with said video information and an identification information for identifying the video information;
   a controller specifying the identification information about a video and motion information piece which is one of the video and motion information pieces and which is to be read, said controller comprising a memory storing titles and identification information of said video and motion information pieces, a guidance display screen for displaying the titles of said video and motion information pieces and a setting input key for specifying one of the video and motion information pieces, said controller specifying the identification information relating to the video and motion information piece which is specified with said setting key;
   a video disk player for reading the video and motion information piece related to the identification information specified by said controller;
   a video display device for displaying the video information included in a video and motion information piece read by said video disk player;
   a display screen of said video display device;
   a seat facing said display screen;

a supporting member integrally supporting said video device and said seat; and a movement device moving said supporting member on the basis of motion information included in the video and motion information piece read by said video disk player, wherein when a repetitive playback instruction and data showing a number of times that said one of the video and motion information pieces is to be repeatedly played back are inputted through said setting input key, said controller controls said video disk player so that the identification information relating to the video and motion information which is to be read is repeatedly specified and read said number of times.

7. An apparatus comprising:

a video disk storing a plurality of video and motion information pieces, each including at least one of a video information, a motion information associated with said video information and an identification information for identifying the video information;

a controller specifying the identification information about a video and motion information piece which is one of the video and motion information pieces and which is to be read, said controller comprising a memory storing titles and identification information of said video and motion information pieces, a guidance display screen for displaying the titles of said video and motion information pieces and a setting input key for specifying one of the video and motion information pieces, said controller specifying the identification information relating to the video and motion information piece which is specified with said setting key;

a video disk player for reading the video and motion information piece related to the identification information specified by said controller;

a video display device for displaying the video information included in a video and motion information piece read by said video disk player;

a display screen of said video display device;

a seat facing said display screen;

a supporting member integrally supporting said video device and said seat;

a movement device moving said supporting member on the basis of motion information included in the video and motion information piece read by said video disk player;

wherein said video and motion information stored in said video disk includes a plurality of divided video and motion information sections, each including a divided identification information piece for identifying said divided video and motion information sections from each other;

said controller sequentially specifies divided identification information pieces respectively included in the divided information sections of the video and motion information which is to be read; and said video disk player sequentially reads the divided video and motion information sections related to the divided identification information pieces sequentially specified by said controller.

8. An apparatus as claimed in claim 7, wherein said controller sequentially specifies a predetermined number of divided identification information pieces in the divided video and motion information sections which are to be read.

9. An apparatus as claimed in claim 7, wherein said controller sets a different specifying order of the divided identification information pieces in the video and motion information which is to be read each time said video and motion information is read.

10. An apparatus as claimed in claim 7, wherein said controller sets a different number of divided identification information pieces in the video and motion information which is to be specified each time said video and motion information is read.

11. An apparatus as claimed in claim 7, wherein:

said controller comprises a card reader and writer which records information on a detachable memory card and reads the information therefrom;

information showing an order of read of the divided identification information pieces specified when the video and motion information piece is read is recorded on the detachable memory card;

said controller specified a new order different from said order of read recorded on the detachable memory card by referring to data showing the order of read when the video and motion information piece which is to be read was previously read; and said controller sequentially specifies the divided identification information pieces in the new order.

12. An apparatus comprising:

a video disk storing a plurality of video and motion information pieces, each including at least one of a video information, a motion information associated with said video information and an identification information for identifying the video information;

a controller specifying the identification information about a video and motion information piece which is one of the video and motion information pieces and which is to be read;

a video disk player for reading the video and motion information piece related to the identification information specified by said controller;

a video display device for displaying the video information included in a video and motion information piece read by said video disk player;

a display screen of said video display device;

a seat facing said display screen;

a supporting member integrally supporting said video device and said seat;

a movement device moving said supporting member on the basis of motion information included in the video and motion information piece read by said video disk player;

wherein said controller comprises a card; said information recorded on a detectable memory card reader and writer which reads information recorded on a detachable memory card;

includes data showing at least one of a weight and age of a person; and means for changing the motion information included in the video and motion information piece read by said video disk player so that a degree of motion generated by said movement device is adjusted on the basis of at least one of the weight and age recorded on the detachable memory card.

* * * * *